Nov. 2, 1926.
W. P. DANIELSON
FRUIT JAR WRENCH
Filed Dec. 19, 1925
1,605,811
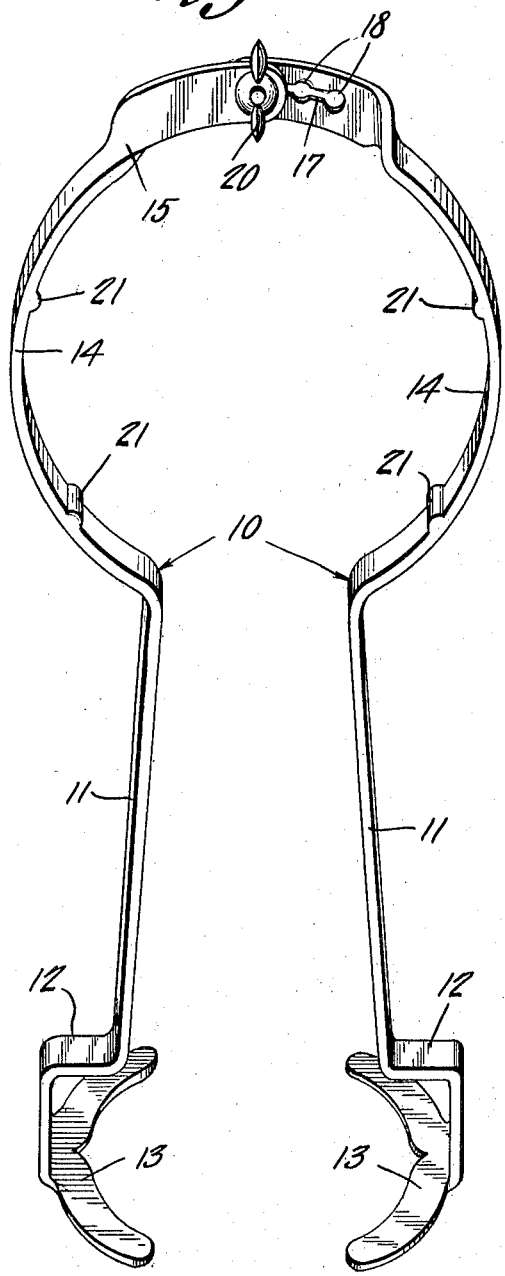
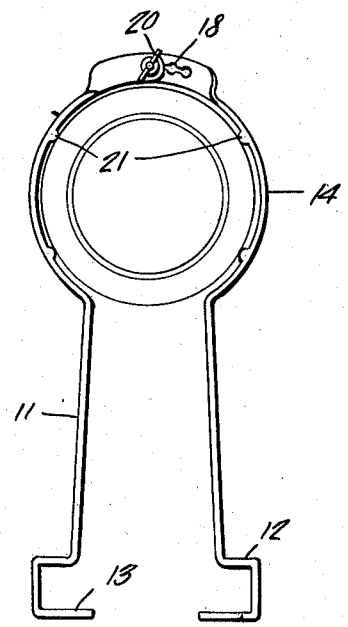
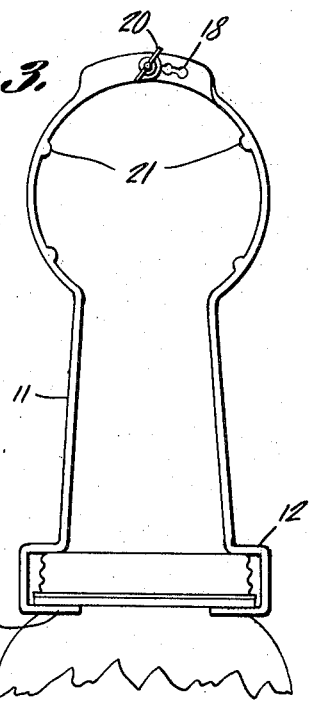
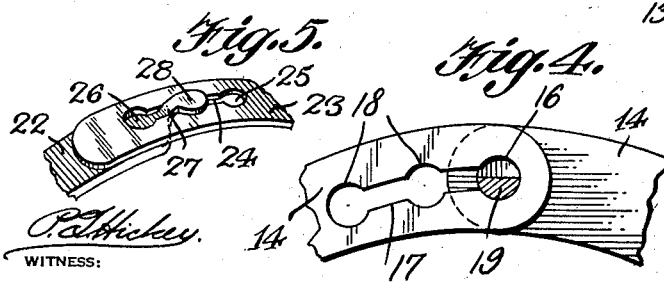
William P. Danielson,
INVENTOR
BY Victor J. Evans
ATTORNEY
WITNESS:

Patented Nov. 2, 1926.

1,605,811

UNITED STATES PATENT OFFICE.

WILLIAM P. DANIELSON, OF THOMPSON, PENNSYLVANIA.

FRUIT-JAR WRENCH.

Application filed December 19, 1925. Serial No. 76,544.

This invention relates to kitchen utensils and has for its object the provision of a novel device by means of which fruit jars may be handled, for instance lifted into and out of boiling water or the like, and also by means of which the jars might be firmly held while the tops are being screwed thereonto, it being of course obvious that there is no particular limitation as to the exact manner of use.

An important object is the provision of a device of this character which is adjustable so as to be capable of use upon cans or jars of widely different sizes.

A further object of the invention is to provide a device of this character which will be simple and inexpensive in manufacture, easy to adjust and use, positive in action, efficient and durable in service, and a general improvement in the art.

With the above and other objects and advantages in view, the invention consists in the details of construction, and the arrangement and combination of parts to be hereinafter more fully described and claimed, and illustrated in the accompanying drawings, in which:—

Figure 1 is a perspective view of the device,

Fig. 2 is an elevation of one side thereof of a top plan showing the device engaged upon a fruit jar, Fig. 3 is an elevation of the device showing it used as tongs, Fig. 4 is a detail view of the joint, and Fig. 5 is a detail perspective view showing a modified form of adjusting means.

Referring more particularly to the drawings, I have shown the device as comprising a pair of substantially similar members designated generally by the numeral 10, each member being formed preferably from resilient steel, quite naturally of comparatively thin gage in order to have resilience. Each member includes an elongated shank or handle portion 11 outwardly offset near its lower end as indicated at 12 and terminating in a curved foot member 13. At its other end each shank 11 is formed with a semi-hook 14, the material being twisted, as indicated at 15. It is intended that the members be adjustably connected by some suitable type of slip joint so that adjustment may be made for jars of different sizes. Obviously, this joint might be varied considerably, though I have shown a certain type for purposes of illustration, constructed as follows. One curved portion 14 has its end formed with a hole 16, while the corresponding and overlapping curved portion of the other member is formed with an arcuate slot 17 having relatively large openings 18 at spaced points, preferably one at each end of the slot and another or others intermediate thereof.

The end portions of the members 14 are arranged in overlapping relation, as clearly indicated in Figs. 1 and 4, and a desired adjusted position is maintained by means of a bolt member 19 which passes through the hole 16 and through a selected one of the enlarged openings 18 and which carries a clamping nut 20, preferably of the wing or thumb type. Obviously, by cutting away one side of the bolt 19 it will be seen that when the bolt is turned in one position it may be passed along the slot 17 into one of the enlarged openings 18, subsequently to which the bolt should be turned at right angles to the position shown in Fig. 4 whereupon it cannot possibly be withdrawn from the enlarged opening back into the slot. This particular construction provides a very quickly and easily adjustable slip joint so that the diameter of the ring formed by the mating portions 14 may be varied, depending upon the size of the cans or jars to be worked on.

As an additional feature, it is preferable that the inner wall of the curved portion 14 of each member 10 be formed with ribs, corrugations, or the like 21 extending transversely thereof and adapted to engage among the raised letters commonly provided on fruit jars, so that when the device is engaged upon a fruit jar and the shank portions or handles 11 drawn together these projections or corrugations 21 will cooperate with the raised letters in the glass to prevent the device from slipping with respect to the jar or can. Obviously, if the device be engaged upon a can and clamped closely, it will hold it firmly while the operator turns the top by means of the other hand or by means of a suitable wrench device.

In Fig. 5 I have illustrated a modified form of adjusting means. Referring to this figure in detail, the numerals 22 and 23 designate the overlapping ends of bands corresponding to the bands 14, and the latter, namely the band 23, is formed with an arcuate slot 24 at the ends of which are enlarged openings 25 and 26. The band 22 has an angularly offset neck 27 terminating in a head 28 of a size slightly larger than that of the openings 25 and 26, the neck 27 being of substantially the same width as the slot 24. When this type of adjustment is used, it is clear that the head 28 may be inserted through either one of the openings 25 and 26 and moved to an intermediate point between the two, whereupon when the bands 22 and 23 are brought into engagement the head 28 will bind frictionally against the band 23 and maintain the desired adjusted position.

In case the device is employed for handling cans, as for instance when placing them in or withdrawing them from boiling water in a cooker of some sort, the jaw members 13 are engaged against the periphery of the can at a point beneath the usual flange thereon, as clearly indicated in Fig. 3. The adjustment feature has already been described and a repetition thereof will be unnecessary. It is believed that the construction, operation, and advantages will be readily apparent to one skilled in the art without further explanation.

While I have shown and described the preferred embodiment of the invention, it should be understood that I reserve the right to make such changes in the form, construction, and arrangement of parts as will not depart from the spirit of the invention or the scope of the subjoined claim.

Having thus described the invention, I claim:—

A tool of the character described comprising a pair of substantially similar members each including an elongated shank terminating in a curved portion twisted near its end, the terminal portion of one member being formed with a hole and the terminal portion of the other being formed with an arcuate slot having a plurality of enlarged openings at its ends and intermediate thereof, a clamping bolt passing through the hole and through said slot, one side of the bolt being cut away to permit it to be moved along the slot when in one position and to maintain it against movement in a selected opening when in the other position.

In testimony whereof I affix my signature.

WILLIAM P. DANIELSON.